Jan. 5, 1960  W. A. HEMMANN  2,919,533
TALL GRASS BENDING AND CONDITIONING ATTACHMENT
FOR REEL TYPE LAWN MOWERS
Filed Jan. 18, 1957  2 Sheets-Sheet 1

INVENTOR:
WILLIAM A. HEMMANN
By Bruinga & Sutherland
ATTORNEYS.

Jan. 5, 1960 W. A. HEMMANN 2,919,533
TALL GRASS BENDING AND CONDITIONING ATTACHMENT
FOR REEL TYPE LAWN MOWERS
Filed Jan. 18, 1957 2 Sheets-Sheet 2
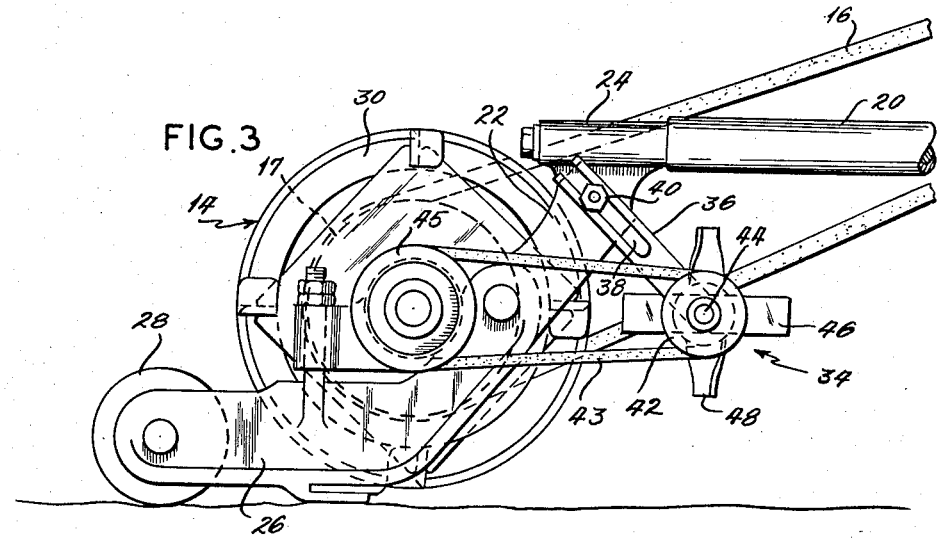
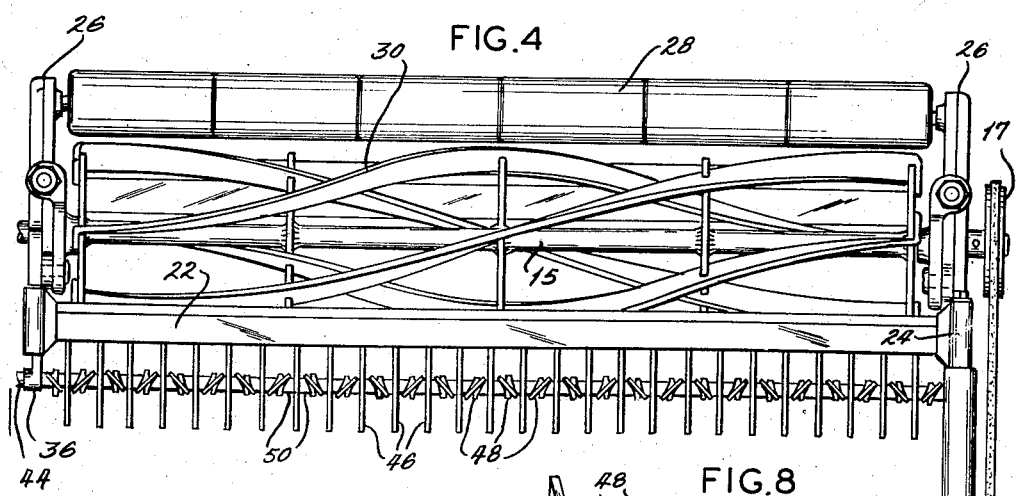
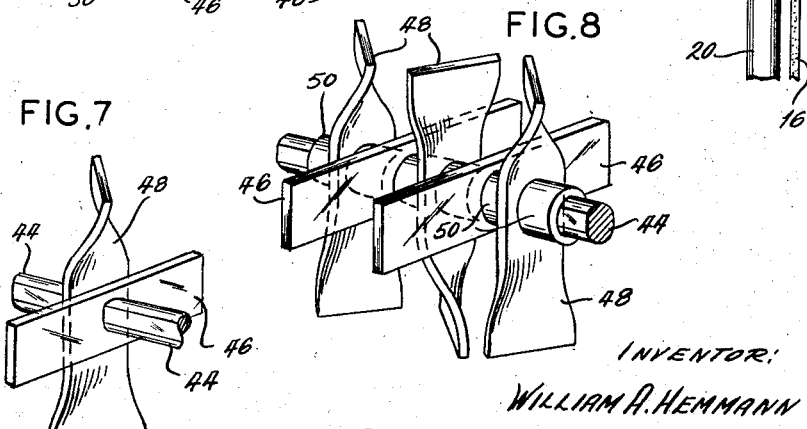
INVENTOR:
WILLIAM A. HEMMANN
By Bruninga & Sutherland
ATTORNEYS.

2,919,533
TALL GRASS BENDING AND CONDITIONING ATTACHMENT FOR REEL TYPE LAWN MOWERS

William A. Hemmann, Creve Coeur, Mo.

Application January 18, 1957, Serial No. 634,902

3 Claims. (Cl. 56—220)

This invention concerns attachments for lawn mowers and more particularly, attachments to be used in conjunction with a reel type mower for the purpose of enabling the reel type mower to properly cut so-called tops or long-stemmed varieties of grass or weeds. Various solutions to the problem of cutting such long stemmed blades with a reel type lawn mower have been proposed in the past but they have either required additional cutting members which were complicated to build and maintain and had to be sharpened very frequently or have not been entirely effective, so that a subsequent use of a rotary mower on the same lawn was necessary in order to complete the job. It is therefore the object of this invention to provide an attachment for a reel-type lawn mower which will efficiently bend such tops or long-stemmed weeds into the blades of the reel-type mower in such a manner and direction that the reel-type mower will be enabled to properly cut them. It is a further object of this invention to provide such an attachment which is easy and cheap to construct and requires no maintenance of any kind.

I will now describe my invention, reference being had to the drawings in which:

Figure 3 is an enlarged side elevation of the reel-type mower showing the devices of my invention attached thereto;

Figure 4 is an enlarged plan view of the mower and attachment;

Figure 7 is an enlarged perspective view of an alternative embodiment of my invention; and Figure 8 is an enlarged perspective view of a preferred embodiment of my invention.

Figure 5:
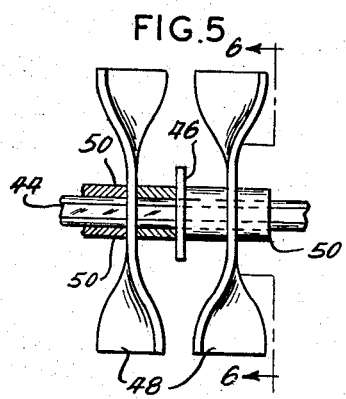
Figure 5 is a detail elevation partly in section showing the manner in which my attachment is assembled.

The device of my invention which I have named a spinner is normally mounted in front of the cutting reel of a reel-type mower and extends over the entire width of the reel. It is mounted approximately level with the center of the reel as best shown in Figure 3 and is rapidly rotated by means of a pulley driven by the drive belt which transmits power from the tractor engine to the reel. The rapid rotation of the spinner blades and their alternate twist, on either side of a straight blade, as shown to particular advantage in Figure 5, results in a combing action which straightens the stems of the objectionable weeds and feeds them into the blades of the reel at an angle at which an optimum cutting action can be exerted on them by the reel. The alternating twist of my spinner blades also insures a complete coverage of the path width of the cutting reel so that substantially all weeds or tops will be caught by the spinner blades and thus enter the cutting mechanism of the reel.

Figure 1:
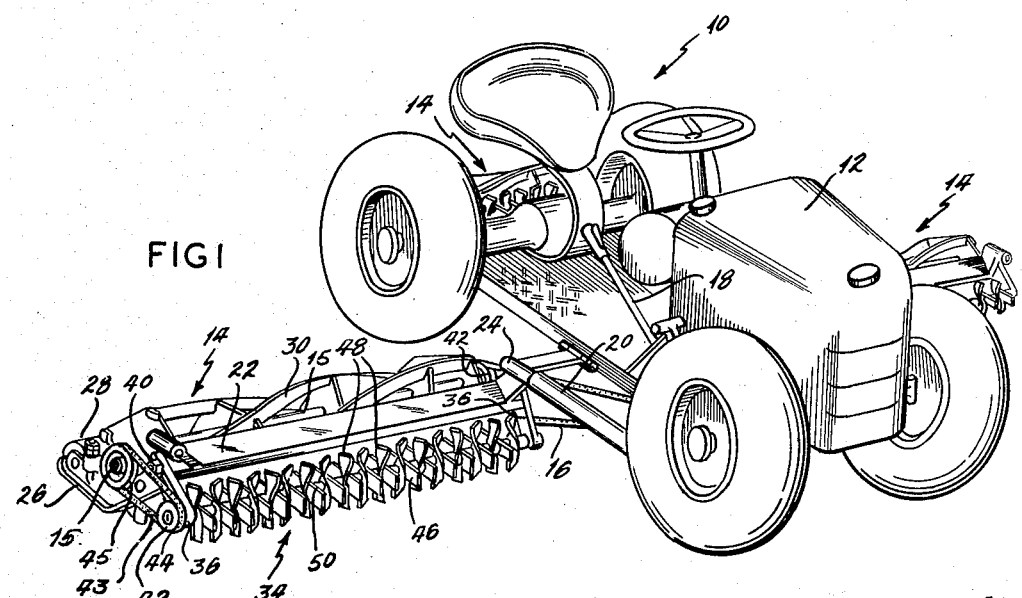
Figure 1 is a perspective view of my device as it would appear mounted in position in conjunction with a tractor-driven reel-type mower.
Figure 2:
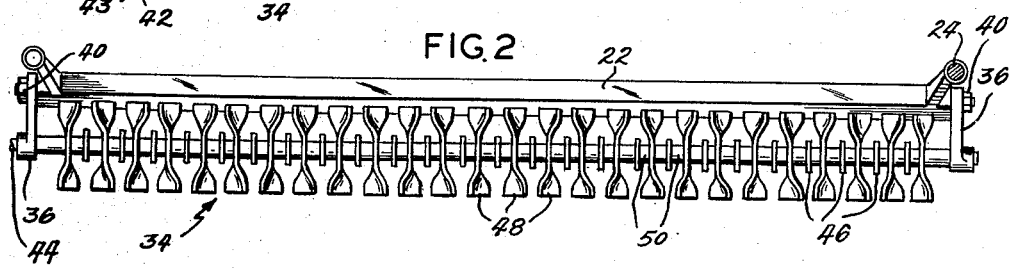
Figure 2 is an enlarged front elevation of the device of my invention.
Figure 6:
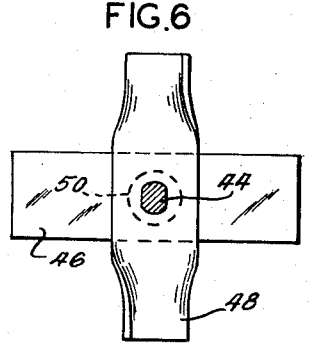
Figure 6 is an enlarged section along lines 6—6 of Figure 5.

Referring now to Figure 1, a tractor carrying a reel-type lawn mower equipped with the device of my invention is generally shown at 10. The tractor 12 may be of any commercially available type and is equipped with a transverse drive shaft (not shown) which drives the reels 14, mounted on shaft 15, by means of belts 16 and pulleys 17. The motion of the reels 14 can be controlled by clutch lever 18. A frame 20 is attached to the tractor 12 and supports the inner end of the reel-carrying frame 22 in such a manner that the entire reel assembly may be pivoted around hinges 24 and raised to a vertical position when the tractor is being moved from one job to another. The outer end of the frame 22 is supported by a frame member 26 which in turn is supported by a roller 28. The height of the roller 28 with respect to the reel blades 30 can be adjusted so as to allow an adjustment of the height of grass which is to be left after cutting. At each end of frame member 22, a short shaft 32 is provided to allow mounting of the spinner 34. The spinner 34 is equipped with a bracket 36 provided with a slot 38, which enables the bracket to be slipped over the shaft 32 without removal of the bolt 40. After the spinner 34 has been so mounted on shaft 32, its position is adjusted so that pulley 42 will engage a belt 43 driven by pulley 45 attached to the shaft 15 of the reel. The bolts 40 are then tightened and the spinner is ready to operate. The spinner 34 itself consists of a shaft 44 fixedly connected to the pulley 42. The portion of the shaft 44 located between the brackets 36 may be flattened as shown to advantage in Figure 6. A number of straight spinner blades 46 and twisted spinner blades 48 are alternately mounted on the shaft 42 at regular intervals throughout its length and are prevented from turning with respect to the shaft by appropriate means, such as, for example, the flattened sides of shaft 44. Each twisted blade 48 is separated from the adjacent straight blades 46 by spacers 50 which are slipped over the shaft 44. It will be noted that the twist of adjacent twisted blades 48 is always in opposite directions for the purpose previously mentioned.

Instead of mounting the straight blades 46 half-way between twisted blades 48, the straight blades may be mounted immediately adjacent the twisted blades, as shown in Figure 7.

In operation, the spinner is rotated by pulley 42 at an angular velocity considerably greater than that of the cutting reel 14. When the tractor 12 is moved in a forward direction, the spinners therefore comb any long-stemmed weeds in their path directly into the blades 30 of the reel 14, and due to their rapid rotation maintain the stems to be cut in a direction parallel to the direction of motion of the tractor, thus enabling the blades 30 to cleanly cut all vegetation in its path.

Use under field conditions of the preferred embodiment described above has shown great superiority of my attachment over previously known machinery used by myself and others. In every case wherein I have used the attachment described herein, it has been my experience that a substantially clean cut of vegetation was obtained and that even on very difficult lawns, it was not necessary to go over the lawn again with a rotary mower in order to get rid of tops.

Although one particular embodiment of my invention has been described herein, it is apparent that my invention can be carried out in many different forms and variations depending on the particular problems encountered in specific cases. I therefore do not desire to be limited to the preferred embodiment shown but only by the scope of the appended claims.

Having thus described my invention, what is claimed and desired to be secured by Letters Patent is:

1. A tall grass bending and conditioning attachment for reel type lawn mowers comprising a rotatable shaft having thereon a plurality of spaced bladelike members of substantially uniform length, at least some of said members having terminal portions which are disposed normal to the axis of said shaft, and others of said members adjacent to said some of said members having terminal portions which are disposed at an angle with respect to the terminal portions of said some of said members, whereby upon rotation of said attachment, tall grass contacted thereby will be bent and properly presented to a reel cutter.

2. The attachment according to claim 1 in which the angle formed by the terminal portions of adjacent ones of said others of said members is bisected by a plane perpendicular to said axis of said shaft.

3. The attachment according to claim 1, in which said members having terminal portions disposed at an angle are displaced by 90° from said some of said members in the direction of rotation of said shaft.

References Cited in the file of this patent

UNITED STATES PATENTS

| | | |
|---|---|---|
| 91,343 | Jackson | June 15, 1869 |
| 1,258,456 | Pulver | Mar. 5, 1918 |
| 2,000,249 | Pew | May 7, 1935 |
| 2,509,343 | Henderson | May 30, 1950 |
| 2,554,669 | Elofson | May 29, 1951 |

FOREIGN PATENTS

| | | |
|---|---|---|
| 257,419 | Great Britain | Sept. 2, 1926 |
| 618,607 | Germany | Aug. 29, 1935 |